UNITED STATES PATENT OFFICE.

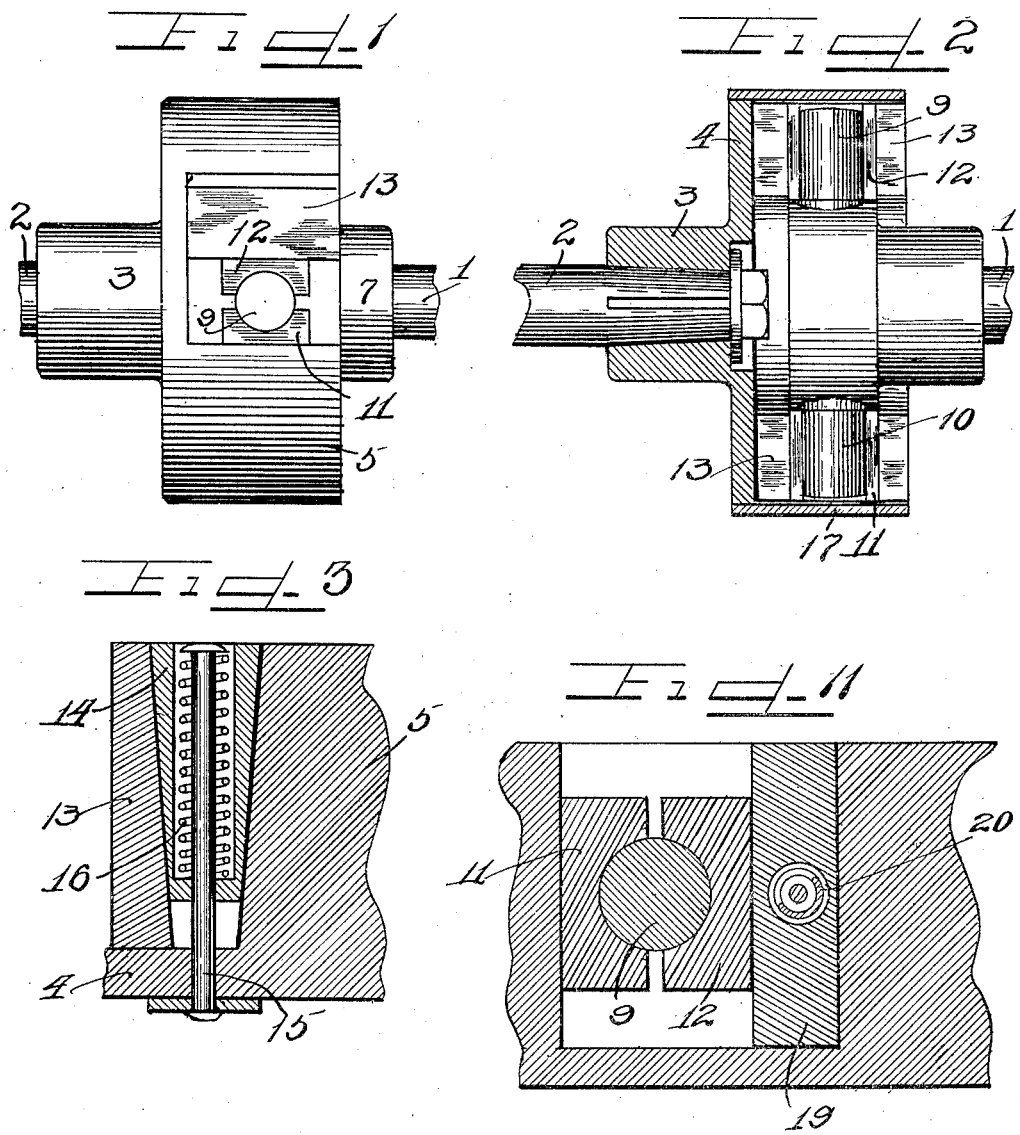

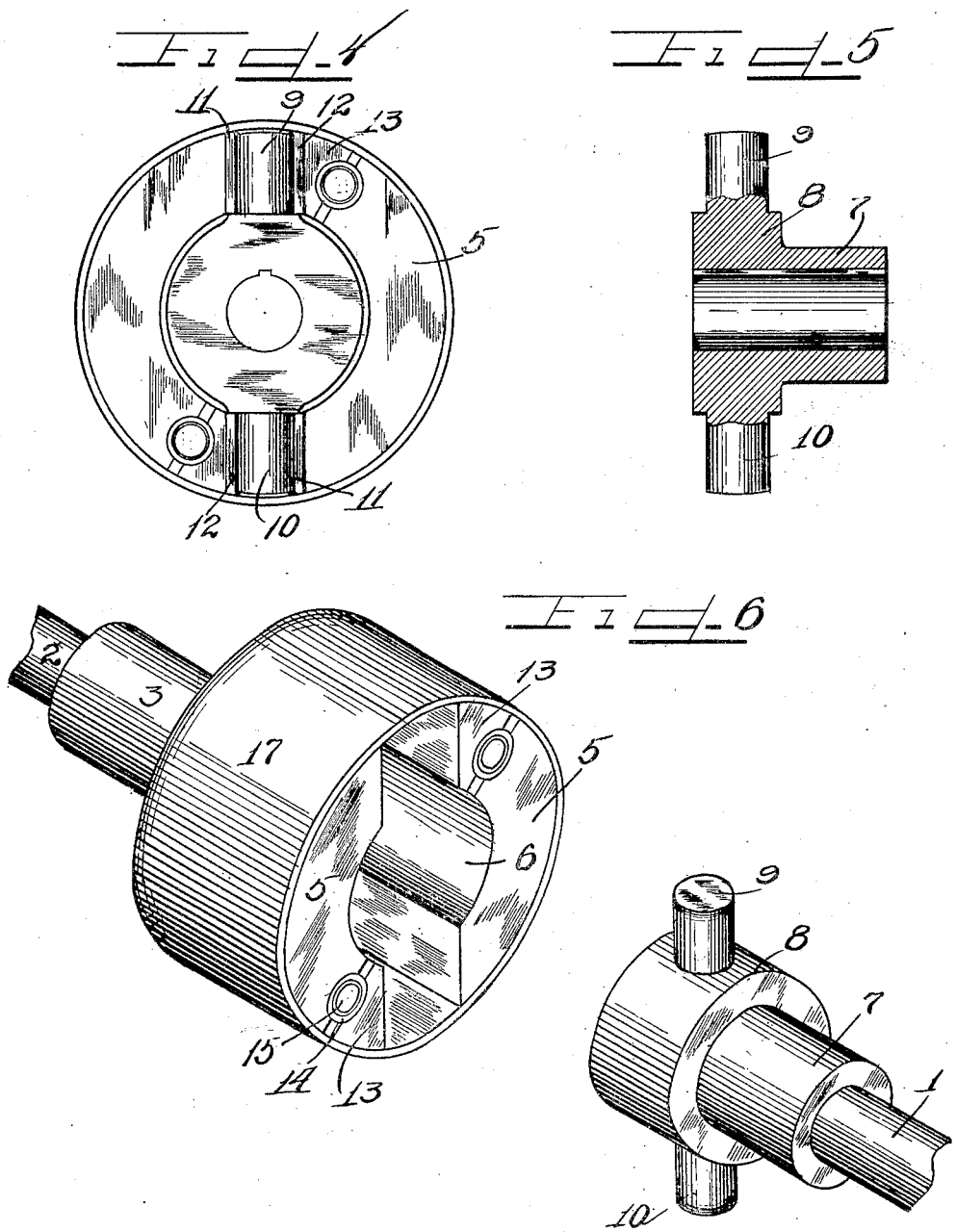

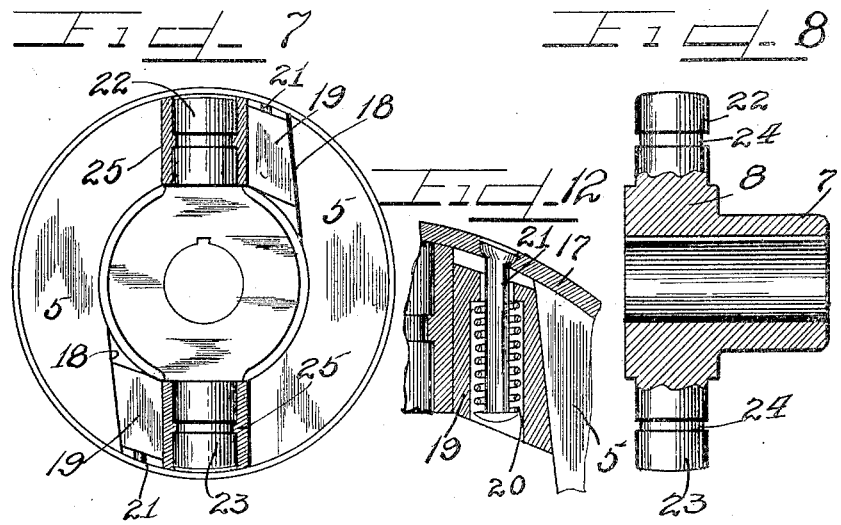
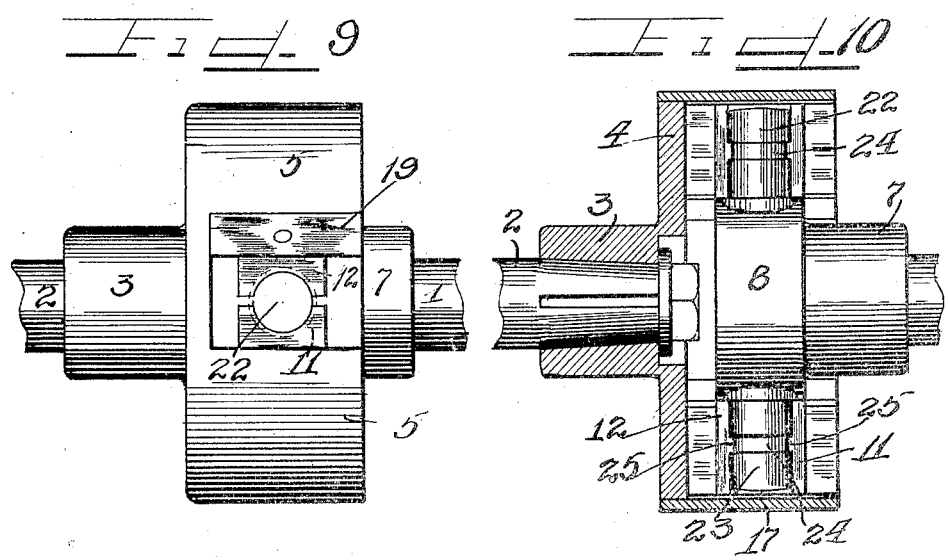

GEORGE T. RAYFIELD, OF CHICAGO, ILLINOIS.

UNIVERSAL COUPLING.

1,346,253.   Specification of Letters Patent.   Patented July 13, 1920.

Application filed September 20, 1917. Serial No. 192,334.

*To all whom it may concern:*

Be it known that I, GEORGE T. RAYFIELD, a citizen of the United States, and a resident of the city of Chicago, in the county of Cook and State of Illinois, have invented certain new and useful Improvements in Universal Couplings; and I do hereby declare that the following is a full, clear, and exact description of the same, reference being had to the accompanying drawings, and to the numerals of reference marked thereon, which form a part of this specification.

It is an object of this invention to provide a universal shaft coupling by means of which shafts may be readily connected without necessitating absolute alinement or absolute accuracy in workmanship.

It is also an object of this invention to provide a shaft coupling in which the shafts may be connected at any angle thereby adapting the coupling for universal use.

It is further an object of this invention to provide a shaft coupling which is easily and quickly assembled and which, owing to its universal adaptation, permits the shafts to be quickly connected and which, in operation, is smooth running and noiseless.

It is further an object of this invention to construct a shaft coupling in which mechanism is provided to automatically take up any wear between the parts to thereby provide a long wearing coupling in which the coupling members always fit snugly together and operate smoothly.

Other and further important objects of this invention will be apparent from the disclosures in the specification and drawings.

The invention (in a preferred form) is illustrated in drawings and hereinafter more fully described.

On the drawings:

Figure 1 is a top plan view of a coupling embodying my invention.

Fig. 2 is a vertical longitudinal section thereof.

Fig. 3 is an enlarged fragmentary detail taken through one of the spring impelled wedge members.

Fig. 4 is a face view of the device coupled.

Fig. 5 is a section of one of the coupler members.

Fig. 6 is a view of the coupling with the coupler members separated.

Fig. 7 is a face view of a modified form of universal coupler.

Fig. 8 is a sectional view of one of the coupler members.

Fig. 9 is a top plan view with the outer ring or shell removed.

Fig. 10 is a view of the coupler showing one member in vertical section and the other in elevation.

Fig. 11 is an enlarged fragmentary sectional detail of the device shown in Fig. 7.

Fig. 12 is a sectional detail of the wedge block.

As shown on the drawings:

1, indicates the driven countershaft or any drive shaft, and 2, the shaft to be driven. Keyed or otherwise secured on shaft 2, is a sleeve or hub 3, integral with which is a disk 4, and a thick peripheral flange 5, which is cut away at diametrically opposite points, as shown in Figs. 4 and 6. Rigidly secured on the shaft 1, is a coupler member which comprises a sleeve 7, having an enlarged part 8, integral with which are oppositely directed bearing members or lugs 9—10. The part 8, is of such diameter as to fit between the rounded faces 6, in flange 5. The bearing members 9—10, are engaged between bearing blocks 11—12, and wedge blocks 13, clamp the jaws together when assembled. These wedge blocks and the flange 5, are provided with complemental recesses in which are engaged an axially movable wedge member 14, provided with a recess therein, through which extends a bolt 15, secured to the disk 4, and a compression spring 16, is seated in the recess and bears against the head of the bolt exerting a constant inward pressure on the wedge block 14, to force the same axially, which in turn forces the wedge block 13, circumferentially to yieldingly retain the jaws together.

As shown clearly in Fig. 2, a shell or ring 17, is secured to the disk 4, and flange 5, and encases the parts. Also as shown in this figure, the outer ends of the members 9—10, are convex or slightly rounded permitting oscillation in one direction, and the coupler member or shaft 1, can pivot on its members 9—10, in bearing blocks 11—12, to thereby swing the shaft radially in a horizontal plane, and enabling positive drive to be assured as a universal joint.

In the construction shown in Figs. 7 to 12, the parts are constructed as before described except the flanges 5, are provided with cam faces 18, and in this construction the wedge blocks 19, are radially movable and provided with a cam face complemental to cam faces 18. The wedge blocks 19, are recessed and seated therein is a spring 20, and a guide bolt 21, on which the block moves, said bolt 21, being riveted to the ring 17.

Another modification shown in these figures is that the bearing members 22—23, are provided with circumferential grooves 24, into which fit lugs 25, integral with the bearing blocks 11—12.

The operation is as follows:

The bearings members 9—10 are seated in the bearing blocks and the coupler members assembled. The wedge blocks 13 or 19, yieldingly holding the blocks and bearings snugly together, prevents all noise and at the same time automatically takes up all wear on the parts.

In connecting the shafts together, if the shafts do not aline, the coupler members on shaft 1, may be adjusted vertically and swung horizontally so that practically any required angle of connection may be attained and the shafts are firmly coupled no matter what the relative angle between the coupled shafts may be.

It is thus seen that a universal shaft coupling is provided and that exact alinement of the shafts is not necessary, as the universality of the coupling will compensate for any inaccuracies both in different sizes and makes of devices, and in workmanship.

Many details of construction may be varied and numerous changes may be made without departing from the principles of this invention. I therefore do not desire to limit this application for patent otherwise than necessitated by the prior art.

I claim as my invention:

1. A coupling comprising a pair of coupling members, bearings slidably engaging one of the coupling members, the other coupling member having pivotal engagement with the first coupling member and means for holding each member engaged with the bearings under tension.

2. In a universal shaft coupling, a coupling member provided with opositely disposed openings or slots and a coupling member provided with oppositely disposed bearing means engaging in said slots for universal adjustment relatively to the first named coupler member, and a wedge block held at a tension to resiliently hold each bearing means in its opening or slot.

3. In a device of the class described, a pair of coupler members pivotally and slidably connected together, and slidable circumferentially adjustable spring controlled bearing blocks for taking up the wear between said coupler members.

4. In a universal shaft coupler, a coupler member having oppositely disposed slots, another coupler member having oppositely disposed lugs to engage therein, bearing blocks for said lugs, a wedge bearing against each set of bearing blocks, and a spring for exerting a constant wedging action of the wedge.

5. In a coupling the combination of a pair of coupling members having a swinging and slidable connection with one another, and an automatically adjustable wedge block, movable in an axial direction for regulating the said connection.

6. In a shaft coupling device, a coupler member, another coupler member interfitting therein and swingingly and slidably adjustable relatively thereof, and a plurality of wedge blocks for automatically taking up the wear between said coupler members.

7. In a universal coupling, a coupler member comprising a sleeve, a disk integral therewith, a slotted flange integral with the disk, a second coupler member comprising a sleeve, a pair of pivot members integral therewith engaging in the slots, bearing blocks on the pivot member in said slots, and a spring impelled wedge member for holding the bearing members snugly in the slot and automatically adjusting the same to take up wear between the parts.

In testimony whereof I have hereunto subscribed my name in the presence of two subscribing witnesses.

GEORGE T. RAYFIELD.

Witnesses:
CHARLES W. HILLS, Jr.,
EARL M. HARDINE.